United States Patent
Hauger et al.

(10) Patent No.: US 9,040,134 B2
(45) Date of Patent: May 26, 2015

(54) PROCESS OF PRODUCING PROFILES WHOSE CROSS-SECTION IS VARIABLE IN THE LONGITUDINAL DIRECTION

(75) Inventors: Andreas Hauger, Attendorn (DE); Reiner Kopp, Aachen (DE); Christoph Wiedner, Sulz (AT)

(73) Assignee: Muhr und Bender KG, Attendorn (DE)

( * ) Notice: Subject to any disclaimer, the term of this patent is extended or adjusted under 35 U.S.C. 154(b) by 503 days.

(21) Appl. No.: 11/904,911

(22) Filed: Oct. 1, 2007

(65) Prior Publication Data

US 2008/0028819 A1 Feb. 7, 2008

Related U.S. Application Data

(62) Division of application No. 11/100,192, filed on Apr. 5, 2005, now Pat. No. 7,418,849.

(30) Foreign Application Priority Data

Apr. 6, 2004 (DE) .......................... 10 2004 017 343

(51) Int. Cl.
| | |
|---|---|
| *B29C 47/00* | (2006.01) |
| *B21C 37/18* | (2006.01) |
| *B21D 5/01* | (2006.01) |
| *B21D 5/08* | (2006.01) |
| *F16L 9/02* | (2006.01) |

(52) U.S. Cl.
CPC ................ *B21C 37/185* (2013.01); *F16L 9/02* (2013.01); *B21D 5/015* (2013.01); *B21D 5/083* (2013.01); *B21D 5/086* (2013.01)

(58) Field of Classification Search
CPC ...... B21C 37/185; B21C 37/08; B21C 37/09; B21C 37/16; B21D 5/015; B21D 5/083; B21D 5/086; F16L 9/02
USPC .......... 428/36.9, 156, 167, 213; 138/155, 156
See application file for complete search history.

(56) References Cited

U.S. PATENT DOCUMENTS

| | | | |
|---|---|---|---|
| 400,025 A | 3/1889 | Wilmot | |
| 1,259,573 A | 3/1918 | Williams | |
| 1,310,130 A * | 7/1919 | Murray | ........................... 29/463 |
| 1,611,858 A * | 12/1926 | Middlekauff | ................ 473/566 |
| 1,715,135 A | 5/1929 | Lambert | |
| 1,763,582 A | 6/1930 | Gulick | |
| 1,879,077 A | 9/1932 | Carlsen | |

(Continued)

FOREIGN PATENT DOCUMENTS

| | | |
|---|---|---|
| DE | 1068204 | 11/1959 |
| DE | 137896 | 10/1979 |
| JP | 59179228 A | 10/1984 |

OTHER PUBLICATIONS

Wallentowitz et al., "Advantages in Body Engineering by Flexible Rolling", Societe des Ingenieurs de L'automobile, 5th International Congress, Jun. 1995.

*Primary Examiner* — Donald J Loney
(74) *Attorney, Agent, or Firm* — MacMillan, Sobanski & Todd, LLC

(57) ABSTRACT

A process of producing profiles whose cross-section is variable in the longitudinal direction, characterized by the process stages of cutting a blank 31 with a substantially constant width along a longitudinal direction, deforming the blank 31 by deep-drawing to form an open profile whose cross-section is variable along the longitudinal direction, and cutting the flanges projecting from the open profile.

10 Claims, 5 Drawing Sheets

(56) References Cited

U.S. PATENT DOCUMENTS

| | | | |
|---|---|---|---|
| 1,879,078 A | | 9/1932 | Carlsen |
| 2,196,497 A | * | 4/1940 | Heman .................. 228/151 |
| 2,869,611 A | | 1/1959 | Stalker |
| 3,452,424 A | * | 7/1969 | Morris ................... 228/147 |
| 3,953,994 A | | 5/1976 | Brawner et al. |
| 4,603,806 A | * | 8/1986 | Watanabe et al. ........... 228/152 |
| 4,603,836 A | | 8/1986 | Godfrey |
| 4,794,956 A | | 1/1989 | Gordon et al. |
| 4,839,496 A | * | 6/1989 | Armier et al. ........... 219/121.63 |
| 4,971,239 A | * | 11/1990 | Tyler et al. ................ 228/146 |
| 5,237,846 A | | 8/1993 | Brooks, Jr. |
| 5,483,813 A | | 1/1996 | Clark et al. |
| 5,657,922 A | | 8/1997 | Lowery et al. |
| 5,836,189 A | * | 11/1998 | Streubel et al. ............ 72/51 |
| 5,836,198 A | | 11/1998 | Guilford |
| 5,904,626 A | * | 5/1999 | Fendel et al. .............. 473/296 |
| 5,924,316 A | | 7/1999 | Streubel et al. |
| 6,536,254 B1 | | 3/2003 | Kawalla et al. |
| 6,748,786 B2 | | 6/2004 | Ooyauchi et al. |
| 2003/0159289 A1 | * | 8/2003 | Van Giezen ............. 29/897.2 |
| 2003/0211352 A1 | * | 11/2003 | Ooyauchi et al. ......... 428/600 |
| 2003/0222385 A1 | | 12/2003 | Cai et al. |
| 2005/0015959 A1 | | 1/2005 | Hauger |
| 2005/0028573 A1 | | 2/2005 | Mologni |

* cited by examiner

PROCESS OF PRODUCING PROFILES WHOSE CROSS-SECTION IS VARIABLE IN THE LONGITUDINAL DIRECTION

The invention relates to a process for producing profiles whose cross-section is variable in the longitudinal direction. DE 196 04 368 C2 proposes a process for producing a tube with portions of different cross-sectional configurations, wherein there is provided a blank having the shape as shown in the developed view of the subsequent tube with a rectangular base region and adjoining portions of a deviating width and wherein the base region is bent into a round shape while forming overlapping regions in the remaining portions, with the remaining portions subsequently being widened with the objective of pulling apart the overlapping regions. Subsequently, the tube can be closed by being welded along a seam.

From DE 196 04 357 A1 there is known a process of producing a tube with longitudinal portions with different wall thicknesses wherein a rolled sheet whose wall thickness differs in the longitudinal direction is deformed in two bending operations to form a tube whose cross-section is substantially uniform in the longitudinal direction.

EP 0 133 705 B1 describes a process of producing tubes whose wall thickness differs in the longitudinal direction, wherein, again, a starting sheet whose thickness is variable in the circumferential direction is bent into a round shape in a plurality of bending operations wherein the resulting tube is to have a constant internal diameter.

It is the object of the present invention to provide a new advantageous process of producing profiles whose cross-section is variable along their length.

The objective is achieved by providing a process which is characterized by the process stages of providing a blank; deforming the blank by deep-drawing in such a way that, as a result of the deep-drawing operation, there is provided a unilaterally open profile whose cross-section is variable in the longitudinal direction and which comprises two flanges projecting from the unilaterally open profile; and cutting the flanges projecting from the unilaterally open profile.

According to the process comprising the above-mentioned inventive process stages, there is produced, in a deep-drawing die, an open profile whose cross-section differs along its length and which comprises flanges which project from the profile open on one side and which are preferably cut in a straight line.

For deep-drawing purposes, a blank is clamped along two parallel side regions into a deep-drawing tool which comprises two parallel cheeks and two holding-down devices which clamp in the blank. A punch which can be moved in between the cheeks comprises a cross-section which is variable along its length and which, during the deep-drawing operation, produces the respective cross-section of the profile to be formed. Between the cheeks and the holding down devices there remain flanges which project from the open profile and which are distorted as a result of material flow during the deep-drawing operation. It is necessary for the flanges projecting from the profile to be subsequently cut in order to remove flange irregularities which invariably occur during the deep-drawing operation. More particularly, it is proposed that the flanges are cut in a straight line parallel to the longitudinal direction in order to form integral parts of the profile. For example, for the purpose of stiffening a planar sheet, such a profile, can be attached by said flanges to said sheet and connected thereto. The profile cross-section which varies along the length can lead to specifically variable dimensional stiffness characteristics of the stiffened sheet.

Alternatively, the flanges can be removed completely during the cutting operation, so that there remains an open profile region only.

According to a further process stage it is proposed that, after the flange has been cut, the unilaterally open profile is deformed in a bending die parallel to the longitudinal direction in order to vary the cross-section of the open profile. In this case, too, there remains a profile whose cross-sectional shape is variable along its length. Depending on the application, the final shape of the profile can be determined by the required strength of the product or by the available space conditions.

According to a preferred process stage, it is proposed that the profile is cut in a straight line parallel to the longitudinal direction and deformed in a bending die until the longitudinal edges abut one another in order to form a profile with a closed cross-section and with a straight seam line. As a rule, said seam line is subsequently welded. The entirely linear extension of the seam line simplifies the execution of the welding operation because with reference to two coordinates, the welding focus can be held so as to be unchanged during the welding operation.

According to an alternative process stage, the profile is cut in the longitudinal direction so as to comprise different widths and is deformed in a bending die until the longitudinal edges abut one another in order to form a profile with a closed cross-section and with a three-dimensionally extending seam line. The unilaterally open profile produced in the deep-drawing die, as a result of the shape predetermined by the bending die, can be formed into a symmetric profile, so that there is obtained a profile member which is symmetric at least relative to a central longitudinal plane, preferably an axially symmetric profile member which is subsequently welded along its three-dimensional seam line. However, the seam line extends in three dimensions in such a way that, during the welding operation, the welding focus has to be varied at least along two coordinates which, preferably, are positioned in a radial plane extending through the longitudinal axis.

In addition to the variable profile strength specifically set by the forming operation, the bending or torsional strength of the profile can further be influenced and set in that the starting material consists of a blank whose thickness is variable in the longitudinal direction or a blank whose thickness is variable perpendicularly relative to the longitudinal direction. The blanks used are so-called Tailor-Rolled Blanks which can be cut to lengths from strip material, for example, which is produced in accordance with the so-called flexible rolling method. The profiles produced in accordance with the invention which can be used as supporting parts in motor vehicle construction can, in this way, be adapted particularly easily to the general strength requirements for motor vehicles and, more particularly, to the strength requirements referring to crash cases.

After the longitudinal seam has been welded, the closed profile whose cross-section is variable along its length can be changed in respect of its cross-section in further process stages in portions by applying external forces and/or in portions by applying internal forces, more particularly internal hydraulic pressure. In this way, further adaptations to existing applications are possible.

A preferred embodiment of the inventive process and of the inventive product are illustrated in the drawings and will be described below.

Figure 1:
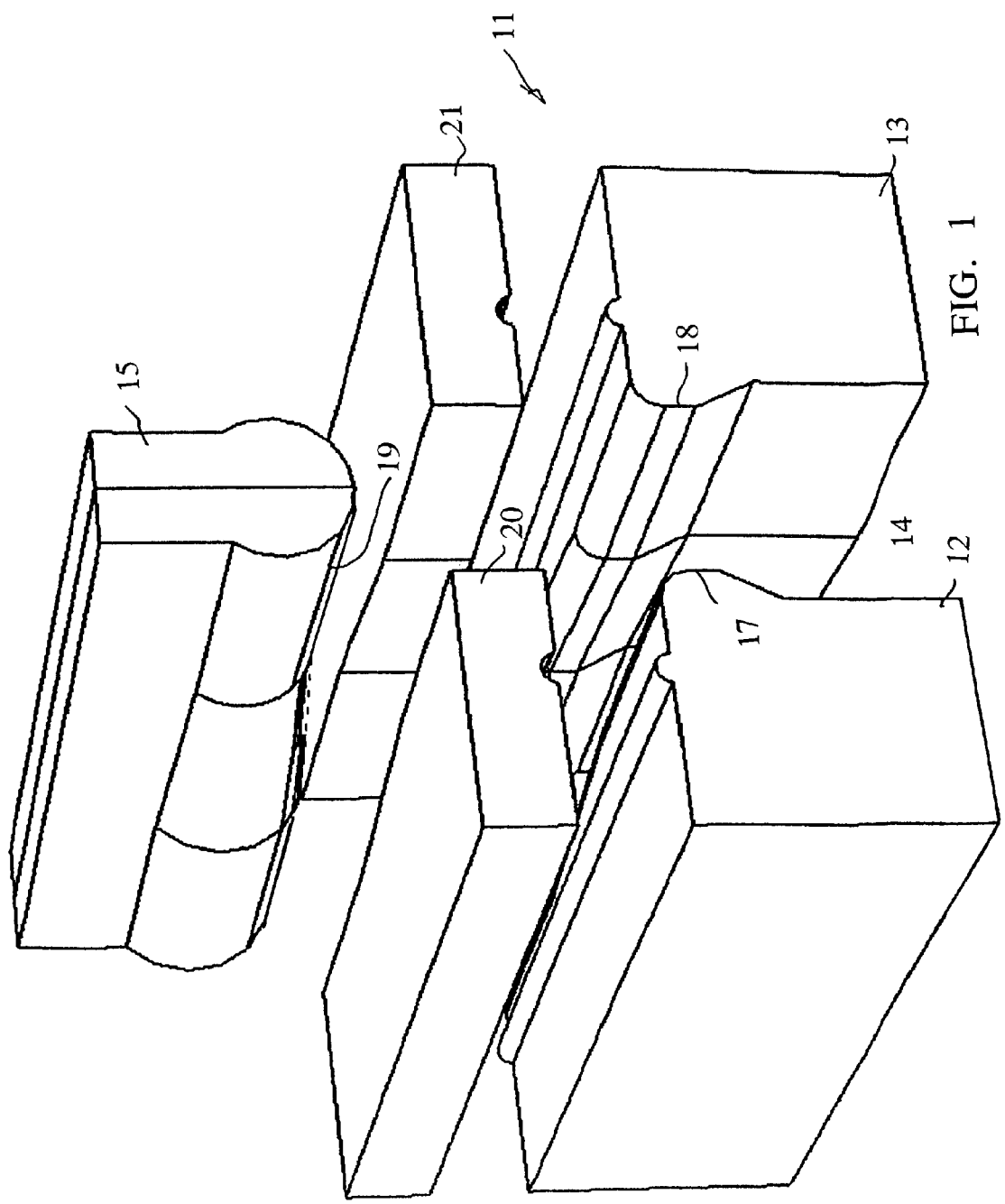
FIG. 1 shows in inventive deep-drawing die in a 3D illustration.

FIG. 1 shows a deep-drawing tool (first die) 11 consisting of a die, which comprises two cheeks 12, 13 represented by their surfaces between which there is formed a deep oblong gap 14, and of a substantially oblong punch 15 which, by means of its horizontal longitudinal extension, can be moved vertically into the gap 14. In the following description, the longitudinal extension of the gap 14 and the longitudinal extension of the punch 15 describe the longitudinal direction of the tool. The cheeks 12, 13 comprise projections 17, 18 which project into the gap 14, with drawn-in side flanks at the punch 15 corresponding to the projections 17, 18. Furthermore, the punch 15, on its underside, comprises a necking 19. The gap 14 is open in the downward direction and it is not adapted to the shape of the punch 15. On the upper side of the cheeks 12, 13, there are provided drawing beads 22, 23. Above the cheeks 12, 13, there are shown holding-down devices 20, 21 whose undersides are provided with recesses 32, 33 which correspond to the drawing beads 22, 23. Before the punch 15 is pressed down, the holding-down devices 20, 21 are lowered on to a blank deposited on the cheeks 12, 13, during which process the cooperation between the drawing beads 22, 23 and the recesses 32, 33 increases the running-in resistance of the blank and prevents the formation of folds. This leads to an improved dimensional stability.

Figure 2:
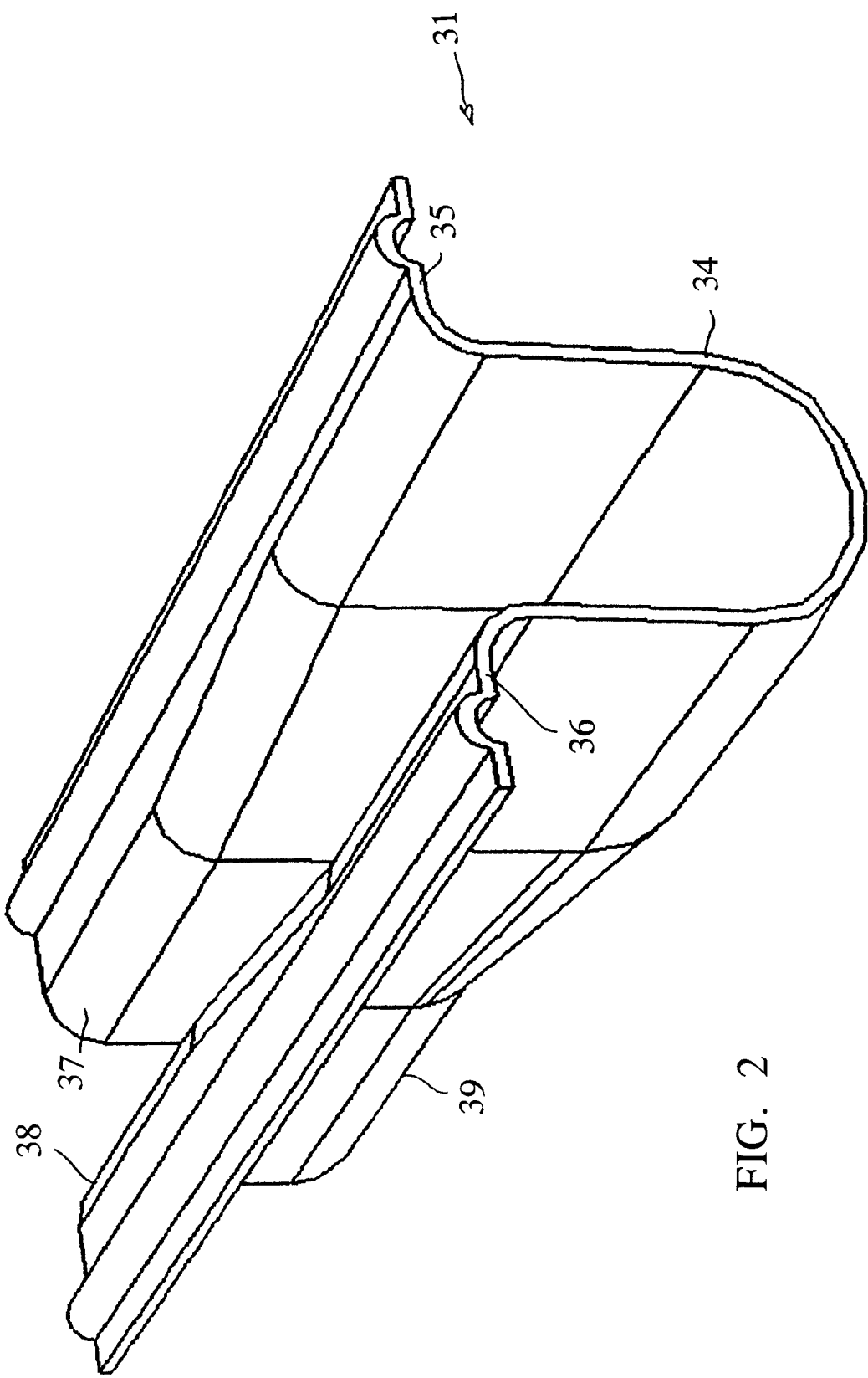
FIG. 2 shows a blank after the deep-drawing process stage.

FIG. 2 shows a unilaterally open profile 31 after it has been deep-drawn in accordance with the invention, optionally after one single deep-drawing operation, using the tool according to FIG. 1. The profile 31 comprises a substantially U-shaped profile region 34 whose cross-section is variable along its length, as well as two flanges 35, 36 projecting therefrom approximately at right angles. In accordance with the projections 17, 18 of the lower tool, the profile comprises laterally drawn-in-notches 37, 38 as well as a profile portion 39 with a reduced depth which corresponds to the necking 19 of the punch 15.

Figure 3:
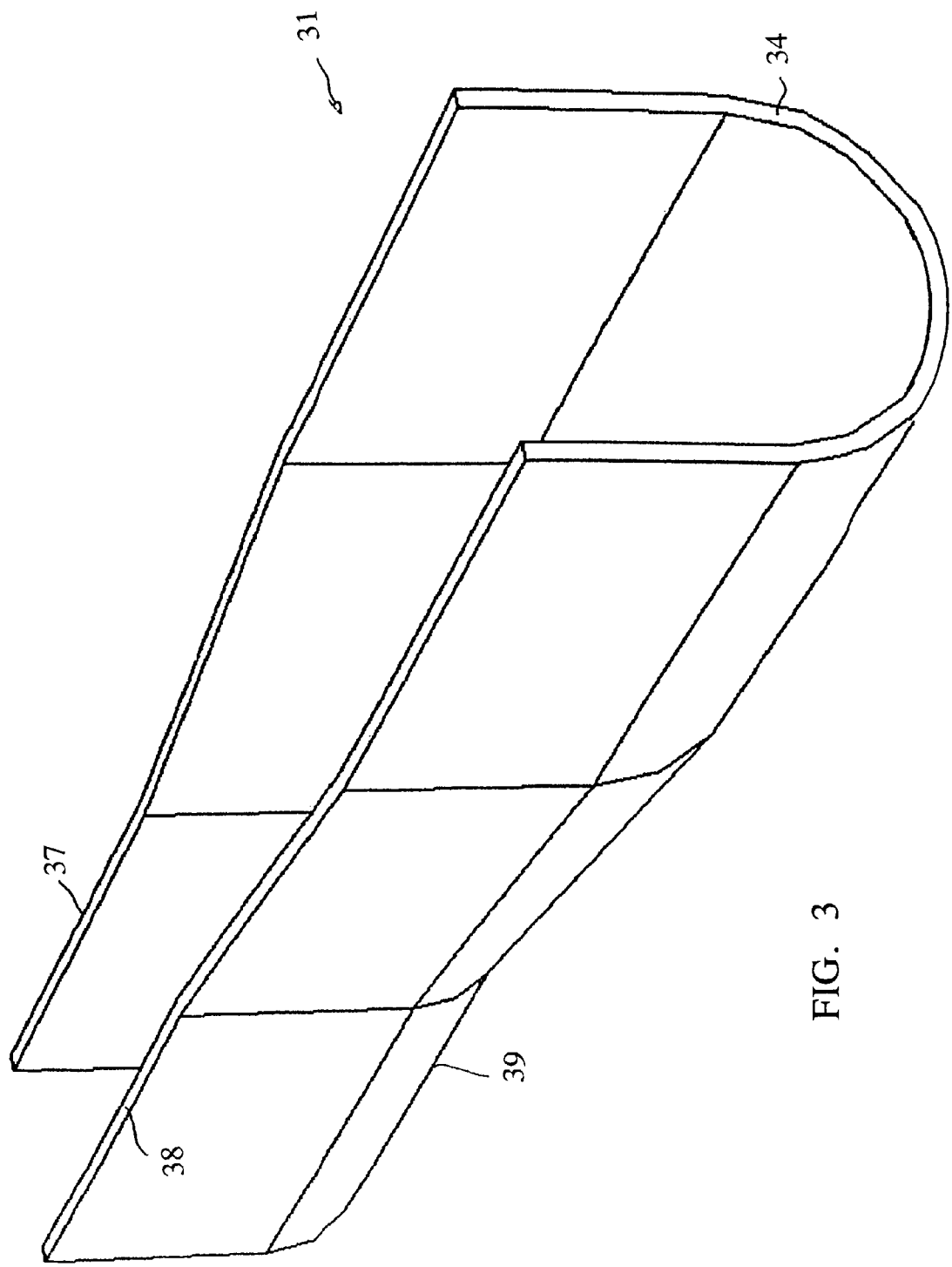
FIG. 3 shows the blank according to FIG. 2 after the operation of cutting the flanges.

FIG. 3 shows the blank according to FIG. 2 deformed into an open profile 31 after the projecting flanges have been cut in accordance with the invention. In the present example, the flanges have been removed completely. There only remains the substantially U-shaped profile region 34 showing the profile portion 39 with a reduced depth as well as the laterally drawn-in notches 37, 38.

Figure 4:
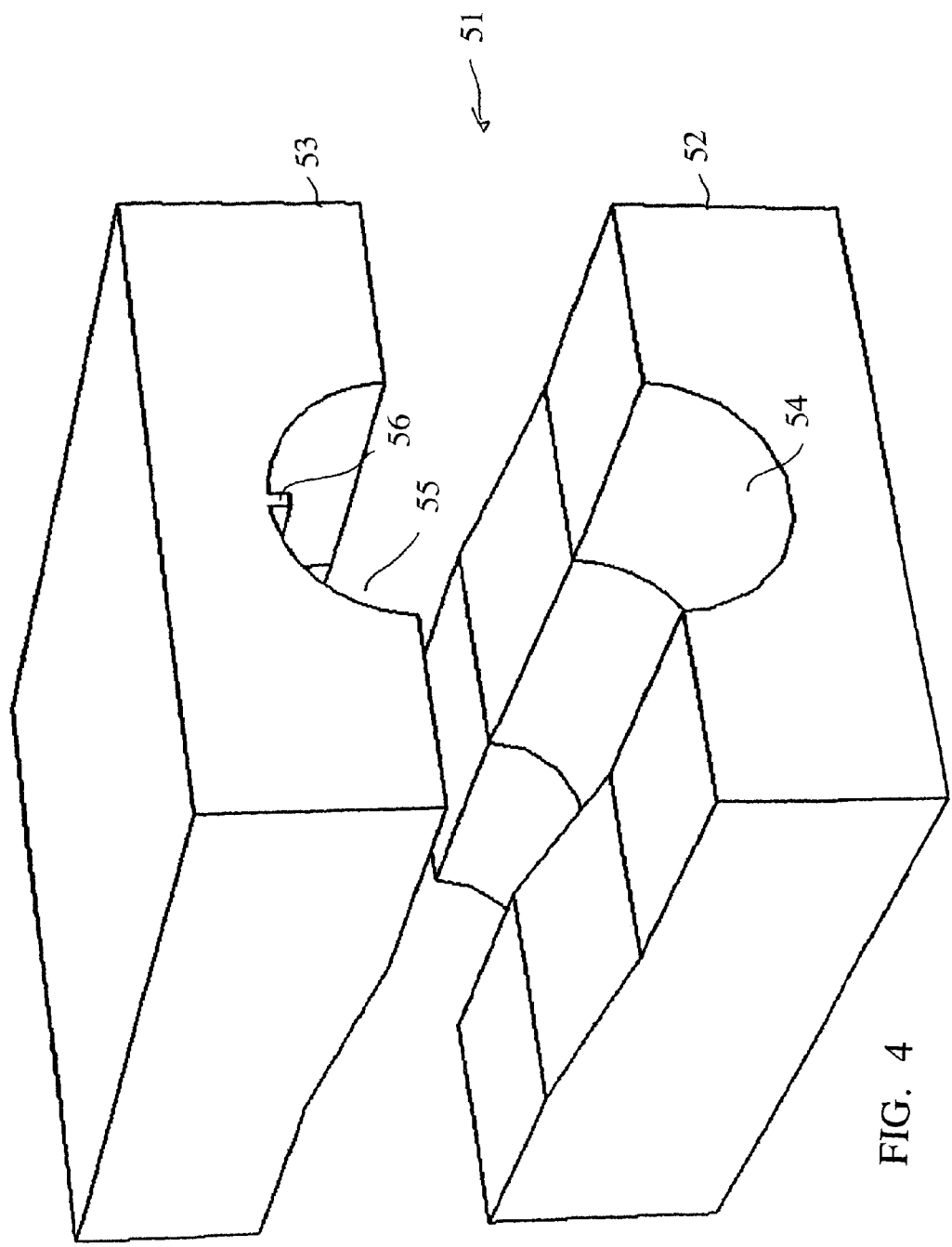
FIG. 4 shows an inventive bending die in a 3D illustration.

FIG. 4 shows a bending die (second die) 51 with a lower tool 52 and an associated upper tool 53 which is lowered on to the lower tool 52 after the deformed profile 31 according to FIG. 3 has been placed into said lower tool 52. The lower tool 52 is a channel-shaped trough 54 whose radius is variable in the longitudinal direction and whose base line is stepped. Into the upper tool 53 there has been formed a channel-shaped trough 55 whose cross-section is also variable in the longitudinal direction and whose base line is straight and carries a rib 56. When the upper tool 53 is lowered on to the lower tool 52, both, together, form a tubular cavity in which the unilaterally open profile according to FIG. 3 is deformed into a profile with a closed cross-section by means of a bending operation.

Figure 5:
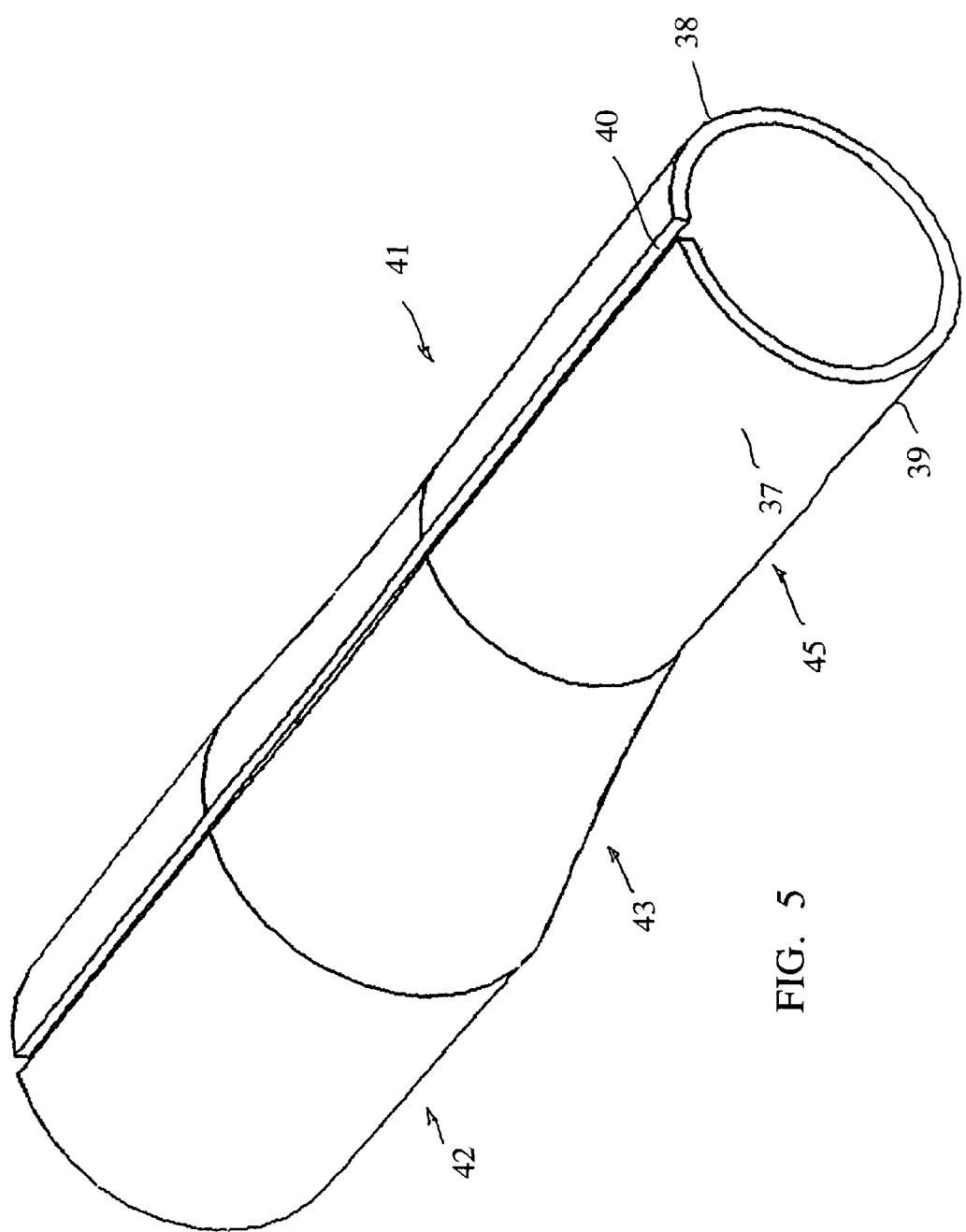
FIG. 5 shows the blank according to FIG. 4 after having been bent into a round shape to form a closed profile.

FIG. 5 shows the blank which has been formed into a closed profile 41, which had been placed into the bending die 52 adapted to the profile 31 and which, by means of the upper tool 53, had been formed either freely or via an inserted mandrel into a closed profile, with a gap 40 having occurred on the upper side, which gap, in the embodiment shown here, extends in a completely straight line. However, if a different method of cutting the flanges or a different shape of the upper tool is used, it is also possible to form a gap with a three-dimensional extension, more particularly in order to form an axially symmetric profile whose diameter is variable along its length. The closed profile 41 can finally be welded along the gap 40.

The gap 40, the drawn-in notches 37, 38 and the portion with a reduced depth 39 can be seen at the closed profile, as a result of which there is formed a profile with a larger end portion 42, a transition cone 43 and a smaller end portion 45.

It goes without saying that, in the same way, it is possible to produce closed profiles whose cross-section is increased or decreased several times along its length, more particularly also in an alternating way. It is possible to achieve a longitudinal symmetry such as it is required in many cases, for example for cross members in motor vehicle construction.

The invention claimed is:

1. A profile produced from one single blank by cutting and bending operations and having a cross-section which is closed and variable along the length, wherein:
   the blank has a wall thickness that is variable in the longitudinal direction,
   the profile comprises a first cylindrical portion defining a first cylinder axis and having a first diameter that is substantially constant along the first cylindrical portion, a second cylindrical portion defining a second cylinder axis and having a second diameter that is substantially constant along the second cylindrical portion and smaller than the first diameter, and a transition portion arranged between the first and second cylindrical portion and having a diameter that varies from the first diameter to the second diameter, wherein:
   the first cylinder axis and the second cylinder axis extend parallel relative to one another,
   each of the first cylindrical portion, the transition portion, and the second cylindrical portion has an outer surface; and
   the profile comprises a straight welded seam line that extends entirely linearly along the outer surfaces of the first cylindrical portion, the transition portion, and the second cylindrical portion, wherein the straight welded seam line extends parallel to the first and second cylinder axes.

2. A profile according to claim 1, further comprising at least longitudinal portions with indentations.

3. A profile according to claim 1, further comprising at least longitudinal portions with outward bulges.

4. A profile according to claim 1, wherein the wall thickness is also variable in a circumferential direction.

5. A tube formed from a single blank of material including:
   a first cylindrical portion that defines a first cylinder axis and has a first diameter that is substantially constant along the first cylindrical portion;
   a transition portion that extends from the first cylindrical portion; and
   a second cylindrical portion that extends from the transition portion and defines a second cylinder axis and has a second diameter that is substantially constant along the second cylindrical portion and that is smaller than the first diameter, wherein:
   the tube has a closed cross-sectional shape throughout the first cylindrical portion, the transition portion, and the second cylindrical portion;
   the first and second cylinder axes extend parallel to one another, and a straight welded seam line extends entirely linearly along the first cylindrical portion, the transition portion, and the second cylindrical portion and parallel to the first and second cylinder axes.

6. The tube defined in claim 5 wherein the single blank of material has a wall thickness that varies in a longitudinal direction.

7. The tube defined in claim 5 wherein the single blank of material has a wall thickness that varies in a circumferential direction.

8. The tube defined in claim 5 wherein the single blank of material has a wall thickness that varies in both a longitudinal direction and in a circumferential direction.

9. The tube defined in claim 5 wherein straight welded seam line extends entirely linearly along outer surfaces of the first cylindrical portion, the transition portion, and the second cylindrical portion.

10. The tube defined in claim 5 wherein straight welded seam line extends unchanged with reference to two coordinates along the tube.

* * * * *